UNITED STATES PATENT OFFICE.

JOSEPH L. TURNER, OF PHILADELPHIA, PENNSYLVANIA, ASSIGNOR TO THE H. K. MULFORD COMPANY, OF PHILADELPHIA, PENNSYLVANIA, A CORPORATION OF PENNSYLVANIA.

METALLIC DERIVATIVE OR COMPOUND OF THE ACTIVE PRINCIPLE OF THE SUPRARENAL GLANDS.

1,061,148. Specification of Letters Patent. Patented May 6, 1913.

No Drawing. Application filed January 29, 1912. Serial No. 674,032.

*To all whom it may concern:*

Be it known that I, JOSEPH L. TURNER, a subject of the Emperor of Russia, having declared my intention of becoming a citizen of the United States, residing in Philadelphia, Pennsylvania, have invented a certain Improved Metallic Derivative or Compound of the Active Principle of the Suprarenal Glands, of which the following is a specification.

The object of this invention is a metallic derivative or compound of the active principle of the suprarenal glands, which shall possess the active blood-pressure-raising, astringent and hemostatic characteristics and properties of said glands in a concentrated form, and from which substantially colorless solutions of commercially useful strengths may be prepared. Such a metallic derivative or compound of the glands I prepare as follows: Fifty pounds of suprarenal glands are disintegrated, and are mixed with five gallons of water to which one ounce of concentrated sulfuric acid, and two ounces of zinc dust have been added. This mixture is then brought up gradually to the temperature of 75° C. and kept at this temperature for say fifteen minutes. The glands are then strained and pressed off, and the residue is treated with an additional five gallons of water in the same manner, and again strained and pressed off. The extracts thus obtained are mixed, and the mixture cooled and filtered. The filtrate is now evaporated at low temperature *in vacuo* to about 600 c.c. and poured into 6000 c.c. of 95 per cent. ethyl alcohol, the mixture being constantly stirred during pouring. The precipitate thus formed is filtered off and to the filtrate is added 350 grams of powdered alum (potassium aluminum sulfate) either dry or in the form of a solution, and this mixture is constantly shaken for from 2 to 3 hours. The liquid is then again filtered and the slightly acid filtrate neutralized by the addition of ammonia; thereupon, a precipitate of an aluminum compound of the active principle of the suprarenal glands separates out, and after standing for an hour in a cool place is filtered off, washed with alcohol and ether, and dried. The aluminum compound thus obtained is a yellowish white amorphous powder, possessing the physiological characteristics of the active principle of the suprarenal gland in concentrated form, but differing from that active principle as heretofore isolated, in the particulars among others of being a metallic derivative, in being amorphous, readily soluble in water at ordinary temperatures, and having no definite melting point.

I do not in this application claim the herein described process, that being claimed in my allowed application for patent Serial Number 643,048 which has matured into Patent 1,016,185.

From the above described metallic derivative or compound of the active principle of the suprarenal gland, commercially stable solutions of various desired strengths for commercial use, as, for example, from 1—500 (0.2%) to 1—10,000 (0.01%) may be made by dissolving a given quantity of the material in water, to which is added that amount of hydro-chloric, boric, or other suitable acid calculated in accordance with the well-known ordinary stoicheiometric proportions, to be required to form a salt with that quantity of the metallic derivative, and adding to this solution a small quantity of a preservative such as, for example, acetone-chloroform, sulfites, or the like.

Other water-soluble, and alcohol-insoluble salts of metals may be employed, for the obtaining of metallic derivatives or compounds, from which substantially colorless solutions possessing the active blood-pressure-raising, astringent and hemostatic characteristics and properties of the suprarenal glands in a concentrated form may be prepared, such salts, for example, as zinc sulfate, or magnesium sulfate. I wish it to be understood, therefore, that I do not limit my claims (save where so expressed) to an aluminum derivative or compound, nor to a metallic derivative or compound when obtained by the particular above described process.

The phrase "substantially colorless solutions" as used in this description and in the accompanying claims is to be understood as referring to solutions sufficiently dilute for medical use, yet of sufficient strength to be commercially useful, as, for example, solutions varying in strength from 1—500 (0.2%) or thereabout, to 1—10,000 (0.01%) or thereabout and as including solutions which, while not absolutely colorless, are so nearly so, as not to be objectionable, by reason of color, to users or venders of this class of remedies.

Claims—

1. A metallic derivative or compound of the active principle of the suprarenal gland, being a compound with said principle of the metallic element of a water-soluble but alcohol-insoluble salt of a metal, said compound possessing the blood-pressure-raising, astringent and hemostatic characteristics and properties of said glands, being readily soluble in water, and capable of forming therein substantially colorless solutions of commercially useful strength.

2. The within described aluminum derivative or compound of the active principle of the suprarenal gland, possessing the active blood-pressure-raising, astringent and hemostatic characteristics and properties of said glands, and being a yellowish-white amorphous powder readily soluble in water at ordinary temperatures, and forming therein a substantially colorless solution.

In testimony whereof, I have signed my name to this specification, in the presence of two subscribing witnesses.

JOSEPH L. TURNER.

Witnesses:
WILLIAM E. BRADLEY,
JOS. H. KLEIN.